(12) United States Patent
Meyer

(10) Patent No.: US 6,639,952 B1
(45) Date of Patent: Oct. 28, 2003

(54) DEMODULATOR SYNCHRONIZATION LOOP LOCK-IN DETECTION CIRCUIT

(75) Inventor: Jacques Meyer, Corenc (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/333,351

(22) Filed: Jun. 15, 1999

(30) Foreign Application Priority Data

Jun. 16, 1998 (FR) .............................................. 98-07721

(51) Int. Cl.[7] .............................................. H03D 3/18
(52) U.S. Cl. ........................ 375/327; 375/373; 329/304
(58) Field of Search ................................ 375/261, 279, 375/280, 281, 324, 326, 327, 329, 332, 354, 355, 373, 376; 329/304, 307; 327/141, 155, 156

(56) References Cited

U.S. PATENT DOCUMENTS

| | | | |
|---|---|---|---|
| 4,712,221 A | | 12/1987 | Pearce et al. |
| 4,987,375 A | * | 1/1991 | Wu et al. .................... 329/309 |
| 5,425,057 A | | 6/1995 | Paff |
| 5,694,440 A | * | 12/1997 | Kallman et al. ............ 375/355 |
| 5,703,526 A | * | 12/1997 | Meyer ........................ 329/304 |
| 5,861,773 A | * | 1/1999 | Meyer ........................ 329/304 |

FOREIGN PATENT DOCUMENTS

EP    0 079 576 A2    5/1983

OTHER PUBLICATIONS

S. Inque, et al. "Development of an FEC Combined Modem for DS–SSMA Communication System", Globecom '90 IEEE Global Telecommunications Conference and Exhibition, vol. 2, Dec. 1990, p.746–750.
French Search Report dated Apr. 1, 1999, with annex on French Application No. 98/07721.

* cited by examiner

Primary Examiner—Betsy L. Deppe
(74) Attorney, Agent, or Firm—Lisa K. Jorgenson; Stephen Bongini; Fleit, Kain, Gibbons, Gutman & Bongini, P.L.

(57) ABSTRACT

A method for detecting the lock-in of a loop that synchronizes an internal clock on the transmission of value pairs provided by a demodulator. According to the method, a module of a vector that has as components the values of one of the value pairs is calculated, and the module is compared with a threshold that is smaller than a theoretical module. The locked-in condition is determined according to the ratio of the number of modules found to be greater than or smaller than the threshold to the total number of modules. In one preferred method, the threshold is incremented by a first value if the module is greater than the threshold and is decremented by a second value if the module is less than the threshold. A lock-in detection circuit for detecting the lock-in of a loop is also provided. A calculation circuit calculates a module of a vector that has as components the values of one of the value pairs. A register stores a threshold and a comparator compares the stored threshold with the calculated module. A modification circuit modifies the stored threshold based on the comparison result, and an analysis circuit analyzes the stored threshold to determine the locked-in condition.

22 Claims, 2 Drawing Sheets

DEMODULATOR SYNCHRONIZATION LOOP LOCK-IN DETECTION CIRCUIT

CROSS-REFERENCE TO RELATED APPLICATIONS

This application is based upon and claims priority from prior French Patent Application No. 98-07721, filed Jun. 16, 1998, the entire disclosure of which is herein incorporated by reference.

BACKGROUND OF THE INVENTION

1. Field of the Invention

The present invention relates to a demodulator, and more specifically to a QPSK demodulator for demodulating a signal that simultaneously transmits two binary signals over two carriers of the same frequency but in phase quadrature.

2. Description of Related Art

A Quadrature Phase-Shift Keying (QPSK) demodulator is used to demodulate a signal that simultaneously transmits two binary signals over two carriers of the same frequency but in phase quadrature. The QPSK demodulator both restores the binary signal pair as it was transmitted and extracts the binary values from the pair of reconstructed signals. The present invention is concerned with the extraction of the binary values from the reconstructed signals, and more specifically with detecting the synchronization of the internal clock on the binary signal transmission rate. FIG. 1 shows the portion of a conventional QPSK demodulator that extracts the binary values from the reconstructed signals. As shown, two analog-to-digital (A/D) converters 10 receive two analog signals Ia and Qa that correspond to the pair of binary signals I and Q after a rough demodulation.

The A/D converters 10 are controlled by a clock signal SCK with a frequency that is greater than the transmission rate of the binary values by the signals I and Q. The outputs of the analog-to-digital converters 10 are supplied to an interpolation filter 12. Based on the sample pairs provided by the A/D converters 10, the interpolation filter 12 calculates the values Is and Qs corresponding to each transmitted binary value pair. The selection of samples Is and Qs is determined by a restored clock CKR that is synchronized on the binary value transmission. In general, the edges of the restored clock CKR, which determine the samples to be selected, occur between two successive samples.

The position of an edge of the restored clock CKR between two samples is indicated by a coefficient k that is used by the filter 12 to interpolate the value of the sample to be selected. This measure is necessary, especially when the binary value transmission rate is close to the sampling frequency of the A/D converters 10, because the restoration of the clock signal CKR is dependent on the amplitude variations of the selected samples. The restored clock CKR and the coefficient k are provided by a digitally controlled oscillator 14 that receives a frequency set point from a synchronization error detection circuit 16 via a low-pass filter 18. The error detection circuit 16 calculates a digital error value based on binary values Is and Qs from the interpolation filter 12 through one of the many conventional error calculation algorithms.

The synchronization loop formed of elements 12, 14, 16, and 18 synchronizes the clock CKR on the binary value transmission. Because these binary values are provided through a rough demodulation, the carrier has not been totally suppressed from the transmitted signals and the vector of components Is and Qs rotates at a frequency equal to the demodulation frequency error. This error is suppressed by a rotation correction circuit that is typically placed (as shown in dotted lines) between the filter 12 and the error detection circuit 16, but can also be placed further downstream.

One problem that arises in such a QPSK demodulator is that the binary value transmission rate can vary widely, and the synchronization loop is generally incapable of re-synchronizing after a change in the transmission rate. To achieve synchronization, successive frequency tests are generally performed and a lock-in detector is used to indicate when the right frequency has been found. A first type of conventional lock-in detector uses the synchronization error signal from the error detection circuit 16 and indicates a lock-in when the error falls below a threshold. However, when receiving conditions are poor, there is no significant difference between the error signals for a locked-in system and an "unlocked" system.

To overcome this problem, another type of lock-in detector uses an algorithm to analyze the stability of the instantaneous frequency. However, such an analysis itself has poor reliability and requires confirmation through many cross-checks, which makes the process particularly complex and slow.

SUMMARY OF THE INVENTION

In view of these drawbacks, it is an object of the present invention to overcome the above-mentioned drawbacks and to provide a lock-in detection circuit with a fast response time. To detect the lock-in of a loop that synchronizes an internal clock on the transmission of values, the module of each vector that has as components the two values of each pair is calculated and compared with a stored threshold. The lock-in condition is determined according to the ratio of the number of modules greater than or smaller than the threshold to the total number of modules.

Another object of the present invention is to provide a lock-in detection circuit that is reliable under poor receiving conditions.

One embodiment of the present invention provides a method for detecting the lock-in of a loop that synchronizes an internal clock on the transmission of value pairs provided by a demodulator. According to the method, a module of a vector that has as components the values of one of the value pairs is calculated, and the module is compared with a threshold that is smaller than a theoretical module. The locked-in condition is determined according to the ratio of the number of modules found to be greater than or smaller than the threshold to the total number of modules. In one preferred method, the threshold is incremented by a first value if the module is greater than the threshold and is decremented by a second value if the module is less than the threshold.

Another embodiment of the present invention provides a lock-in detection circuit for detecting the lock-in of a loop that synchronizes an internal clock on the transmission of value pairs provided by a demodulator. The lock-in detection circuit includes a calculation circuit, a register, a comparator, a modification circuit, and an analysis circuit. The calculation circuit calculates a module of a vector that has as components the values of one of the value pairs. The register stores a threshold and the comparator compares the stored threshold with the calculated module. The modification circuit modifies the stored threshold based on the comparison result, and the analysis circuit analyzes the stored threshold to determine the locked-in condition. In a preferred embodiment, the modification circuit increments the stored threshold by a first value if the module is greater than the stored threshold, and decrements the stored threshold by a second value if the module is smaller than the stored threshold.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 1:
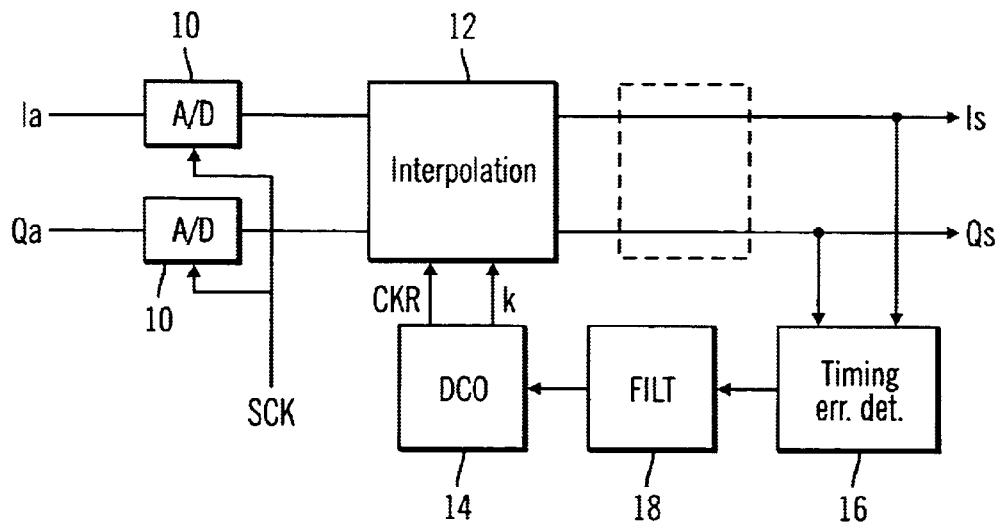
FIG. 1 is a block diagram showing a portion of a conventional QPSK demodulator for regenerating the transmission frequency of the modulated signals.
Figure 2:
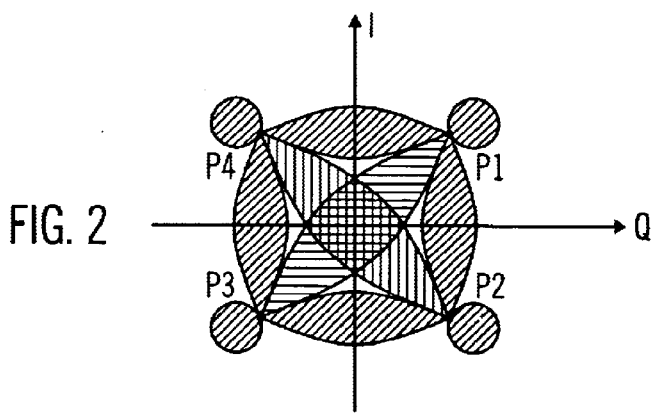
FIG. 2 is a graph showing a constellation of four points that correspond to the theoretical values transmissible by a QPSK-modulated signal and the areas of probable appearance of the points under practical conditions.

FIG. 2 shows a constellation of four points P1 to P4 that illustrate the four possible theoretical combinations for the pair of values Is and Qs that is provided by a QPSK demodulator of the type shown in FIG. 1. The points P1 to P4 appearing in an actual system become more and more distant from the points shown in FIG. 2 as the system is disturbed or is further away from the lock-in condition. The actual points have a maximum appearance probability in the hatched areas of FIG. 2. According to the present invention, an analysis is made of the positions of the constellation points of in an actual system.

Figure 3:
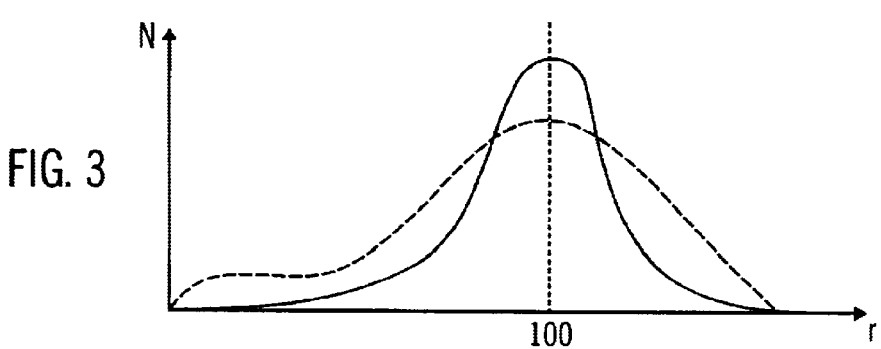
FIG. 3 is a graph showing distributions of distances to the origin of points of the constellation for a locked-in system and an unlocked system.

When the system is locked-in and the signals have undergone an adequate rotation correction, the points have a high probability of appearing in the vicinity of the theoretical points. This probability decreases as the signal-to-noise ratio of the transmission deteriorates. (In the absence of a rotation correction, the points have a high probability of appearing at a fixed distance from the origin.) On the other hand, when the system is not locked in, the points scatter so as to have a relatively high probability of appearing close to the origin of the constellation. FIG. 3 shows a solid line that represents an exemplary distribution of distances r to the origin for the constellation points of a locked-in system, and a dotted line that represents the same distribution in an unlocked system. The distance indicated as "100" corresponds to the theoretical distance.

As shown, the probability of appearance of points close to the origin is significantly higher in the unlocked system.

According to the present invention, a sufficient number of consecutive points are observed and the system is determined to be locked-in when the proportion of points close to the origin is smaller than a threshold. While a fixed threshold could be used for this purpose, the distributions illustrated in FIG. 3 appear to change according to the signal-to-noise ratio of the transmission. In particular, the distributions widen and flatten when the noise increases. Thus, a proper threshold for one signal-to-noise ratio may not be adequate for another signal-to-noise ratio. Further, the signal-to-noise ratio of the transmission is a priori unknown.

Figure 4:
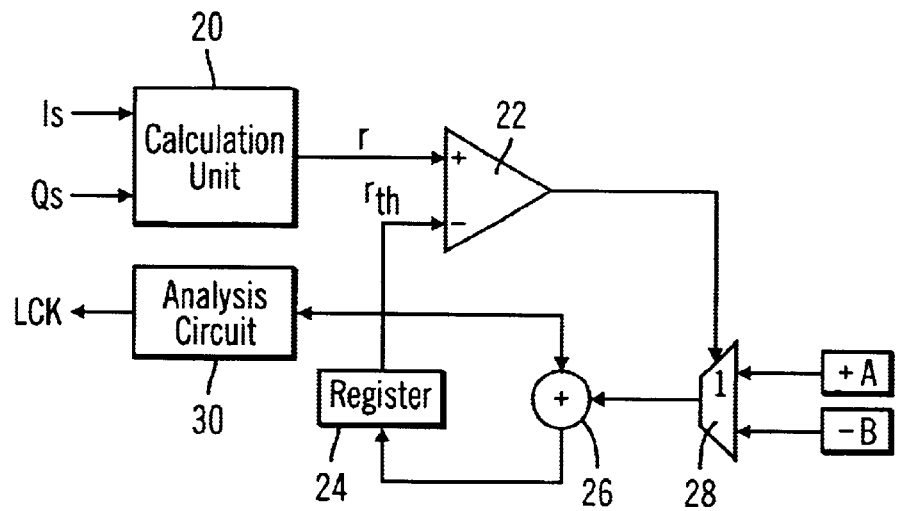
FIG. 4 is a block diagram showing a lock-in detector according to a preferred embodiment of the present invention.

FIG. 4 shows a lock-in detection circuit according to a preferred embodiment of the present invention that avoids the problems caused by an unknown signal-to-noise ratio. As shown, a calculation circuit 20 receives a value pair Is and Qs from the demodulator (FIG. 1) and calculates the module r of the vector having values Is and Qs as components. Thus, the value r is the distance to the origin of the constellation for the point corresponding to values Is and Qs. A comparator 22 is used to compare the distance r with a threshold distance $r_{th}$ that is stored in a register 24. The contents of the register 24 (i.e., the threshold distance $r_{th}$) are modified based on the result of the comparison.

More specifically, when the distance r is greater than the threshold distance $r_{th}$, the stored threshold $r_{th}$ is incremented by a value A. On the other hand, when it is less, the stored threshold $r_{th}$ is decremented by a value B, which is greater than A. For this purpose, an adder 26 updates the contents of register 24 with the sum of the presently-stored threshold $r_{th}$ and the output of a multiplexer 28, which receives value A on a first input and value -B on a second input. The comparator 22 controls multiplexer 28 so as to select the appropriate value A or -B.

During operation, after having counted a sufficient number of points, the threshold $r_{th}$ settles at a value such that the proportion of distances r found under threshold $r_{th}$ is equal to A/(A+B). In other words, threshold $r_{th}$ is automatically adjusted to a value such that the probability of having a distance under threshold $r_{th}$ is equal to the ratio A/(A+B). Another circuit 30 analyzes the variation of the threshold stored in register 24 and activates a lock-in signal LCK when the threshold corresponds to the specific criteria described below.

Figure 5:
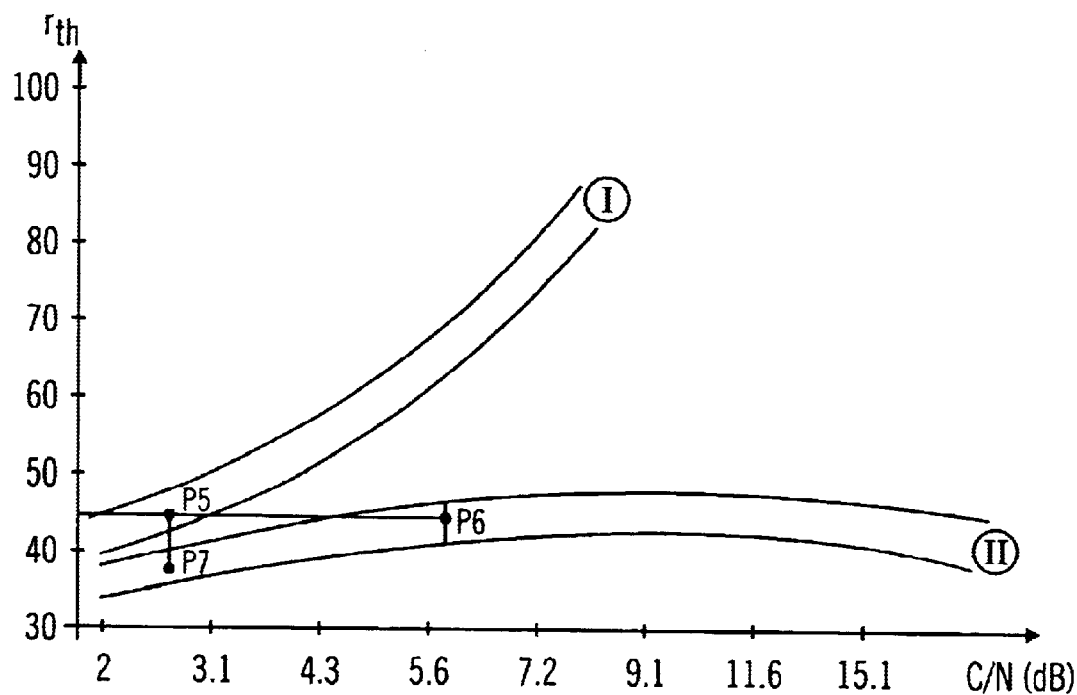
FIG. 5 is a graph showing areas of locking and unlocking equiprobability according to the signal-to-noise ratio of a transmission and to a reference distance to the origin of the constellation points.

FIG. 5 shows two equiprobability bands: one (I) corresponding to a locked-in system and another (II) corresponding to an unlocked system. The bands are based on the signal-to-noise ratio of the transmission, and each equiprobability band corresponds to a constant probability determined by increments A and B and provides the range in which the threshold $r_{th}$ settles for a given signal-to-noise ratio. The exemplary dimensions shown in FIG. 5 correspond to a 1/16 probability of the distance r being lower than the threshold $r_{th}$. In FIG. 5, it is practically certain that the system is locked-in when the threshold $r_{th}$ settles at a value greater than 50. Thus, analysis circuit 30 activates the lock-in signal LCK when the threshold $r_{th}$ becomes greater than 50. Further, it is practically certain that the system is unlocked if the threshold $r_{th}$ settles at a value smaller than 40.

However, there remains an uncertainty range between 40 to 50. In this range, the same threshold can correspond to a locked-in state with a small signal-to-noise ratio or an unlocked state with a higher signal-to-noise ratio. This is illustrated in FIG. 5 by two points of the same threshold (45), one of which P5 is at a signal-to-noise ratio smaller than 3 dB and the other of which P6 is at a signal-to-noise ratio of approximately 5.6 dB. In such an ambiguous case, it is sufficient for the analysis circuit 30 to force the frequency of the oscillator 14 (FIG. 1) to a value that is clearly different from the current value and observe the threshold $r_{th}$ again.

If the threshold $r_{th}$ scarcely moves, the system's condition does not change so the system can only be unlocked (i.e., the threshold $r_{th}$ remains within the limits of band II). It is very unlikely for the threshold $r_{th}$ to pass from an unlocked condition to a locked-in condition by performing an arbitrary frequency jump, and thus for point P6 to pass into band I after the frequency change. However, if the threshold $r_{th}$ significantly lowers after the frequency change, the system operating condition has changed (i.e., it has switched from the locked-in state to the unlocked state as illustrated in FIG. 5 by point P7 having a threshold under 40). In such a case, the analysis circuit 30 restores the initial frequency and activates the lock-in signal LCK.

Good performance results are obtained for a ratio A/(A+B) of between 1/20 and 1/10. For low ratios band II increases faster, whereas for high values, band I increases slower and becomes wider. The calculation circuit 20 receives values Is and Qs immediately at the output of interpolation filter 12 in some embodiments, but after rotation correction in other embodiments. In other words, the rotation error has no influence upon the distance calculations. The lock-in detection of the present invention requires the observation of a sufficiently high number of points (e.g., several thousand) to be representative of the system's operating condition. However, the required number of points is much smaller than that required by the conventional circuits (typically some tens of thousands).

The present invention can also be embodied in a machine-readable medium encoded with a program for detecting the lock-in of a loop that synchronizes an internal clock on the transmission of value pairs. In such embodiments, the program encoded in the machine-readable medium contains instructions for calculating a module of a vector that has as components the values of one of the value pairs, comparing the module with a threshold, and determining the locked-in condition according to the ratio of the number of modules found to be greater than or smaller than the threshold to the total number of modules. In one embodiment, the determination of the locked-in condition is based on the threshold value reached after processing a predetermined number of value pairs.

In some embodiments, the program further contains instructions for incrementing the threshold by a first predetermined value (A) if the module is greater than the threshold, and decrementing the threshold by a second predetermined value (B), which is greater than the first predetermined value, if the module is less than the threshold. The first and second predetermined values can be chosen so that a ratio of the first predetermined value divided by the sum of the first and second predetermined values (A/A+B) is equal to the desired probability for the module to be smaller than the settled threshold value. In one preferred embodiment, the locked-in condition is detected when the threshold is greater than a constant limit value, and is also detected when the threshold is less than the limit value and a forced variation of the internal clock frequency causes a significant decrease in the threshold.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for detecting the lock-in of a loop that synchronizes an internal clock on the transmission of value pairs provided by a demodulator, said method comprising the steps of:

calculating a module of a vector that has as components the values of one of the value pairs;

comparing the module with a threshold; and determining a locked-in condition according to the ratio of the number of modules found to be greater than or smaller than the threshold to a total number of modules.

2. The method as defined in claim 1, further comprising the steps of:

incrementing the threshold by a first predetermined value (A) if the module is greater than the threshold; and decrementing the threshold by a second predetermined value (B), which is greater than the first predetermined value, if the module is less than the threshold.

3. The method as defined in claim 2, wherein the first and second predetermined values are chosen so that a ratio of the first predetermined value divided by a sum of the first and second predetermined values (A/(A+B)) is equal to a desired probability for the module to be smaller than a settled threshold value.

4. The method as defined in claim 2, wherein in the determining step, the locked-in condition is determined based on the threshold reached after processing a predetermined number of value pairs.

5. The method as defined in claim 4, wherein the first and second predetermined values are chosen so that a ratio of the first predetermined value divided by the sum of the first and second predetermined values (A/(A+B)) is equal to a desired probability for the module to be smaller than a settled threshold value.

6. The method as defined in claim 4, wherein the locked-in condition is detected when the threshold is greater than a constant limit value.

7. The method as defined in claim 6, wherein the locked-in condition is also detected when the threshold is less than the constant limit value and a forced variation of the internal clock frequency causes a change in system operating condition.

8. The method as defined in claim 7, wherein a non-locked-in condition is detected when the threshold is less than another constant limit value.

9. The method as defined in claim 1, wherein the locked-in condition is detected when the threshold is greater than a constant limit value.

10. The method as defined in claim 9, wherein a non-locked-in condition is detected when the threshold is less than another constant limit value.

11. A machine-readable medium encoded with a program for detecting the lock-in of a loop that synchronizes an internal clock on the transmission of value pairs, said program containing instructions for performing the steps of:

calculating a module of a vector that has as components the values of one of the value pairs;

comparing the module with a threshold; and determining the locked-in condition according to the ratio of the number of modules found to be greater than or smaller than the threshold to a total number of modules.

12. The machine-readable medium as defined in claim 11, wherein said program further contains instructions for performing the steps of:

incrementing the threshold by a first predetermined value (A) if the module is greater than the threshold; and decrementing the threshold by a second predetermined value (B), which is greater than the first predetermined value, if the module is less than the threshold.

13. The machine-readable medium as defined in claim 11, wherein in the determining step, the locked-in condition is determined based on the threshold reached after processing a predetermined number of value pairs.

14. The machine-readable medium as defined in claim 12, wherein the first and second predetermined values are chosen so that a ratio of the first predetermined value divided by a sum of the first and second predetermined values (A/(A+B)) is equal to a desired probability for the module to be smaller than a settled threshold value.

15. The machine-readable medium as defined in claim 13, wherein the locked-in condition is detected when the threshold is greater than a constant limit value.

16. The machine-readable medium as defined in claim 15, wherein the locked-in condition is also detected when the threshold is less than the constant limit value and a forced variation of the internal clock frequency causes a change in system operating condition.

17. A lock-in detection circuit for detecting the lock-in of a loop that synchronizes an internal clock on the transmission of value pairs provided by a demodulator, said lock-in detection circuit comprising:

a calculation circuit for calculating a module of a vector that has as components the values of one of the value pairs;

a register storing a threshold;

a comparator for comparing the threshold stored in the register with the module calculated by the calculation circuit, the comparing generating a comparison result;

a modification circuit for modifying the threshold stored in the register based on the comparison result; and an analysis circuit for analyzing the threshold stored in the register to determine a locked-in condition.

18. The lock-in detection circuit as defined in claim 17, wherein the modification circuit increments the stored threshold by a first predetermined value (A) if the module is greater than the stored threshold, and decrements the stored threshold by a second predetermined value (B), which is greater than the first predetermined value, if the module is smaller than the stored threshold.

19. The lock-in detection circuit as defined in claim 18, wherein the first and second predetermined values are chosen so that a ratio of the first predetermined value divided by a sum of the first and second predetermined values (A/(A+B)) is equal to a desired probability for the module to be smaller than a settled threshold value.

20. The lock-in detection circuit as defined in claim 17, wherein the analysis circuit determines the looked in condition based on the stored threshold reached after processing a predetermined number of value pairs.

21. The lock-in detection circuit as defined in claim 18, wherein the analysis circuit determines the locked-in condition when the stored threshold is greater than a constant limit value.

22. The lock-in detection circuit as defined in claim 21, wherein the analysis circuit also determines the locked-in condition when the stored threshold is less than the constant limit value and a forced variation of the internal clock frequency causes a change in system operating condition.

* * * * *